(12) United States Patent
Geyl

(10) Patent No.: US 8,816,995 B2
(45) Date of Patent: Aug. 26, 2014

(54) INDEXING AND HOLOGRAPHIC DISPLAY SYSTEM FOR MANUAL CONTROL INTERFERENCE

(75) Inventor: Laurent Geyl, Strasbourg (FR)

(73) Assignee: Delphi Technologies, Inc., Troy, MI (US)

( * ) Notice: Subject to any disclaimer, the term of this patent is extended or adjusted under 35 U.S.C. 154(b) by 117 days.

(21) Appl. No.: 13/640,614

(22) PCT Filed: Mar. 24, 2011

(86) PCT No.: PCT/EP2011/054524
§ 371 (c)(1),
(2), (4) Date: Oct. 11, 2012

(87) PCT Pub. No.: WO2011/128196
PCT Pub. Date: Oct. 20, 2011

(65) Prior Publication Data
US 2013/0033463 A1 Feb. 7, 2013

(30) Foreign Application Priority Data
Apr. 12, 2010 (FR) ..................................... 10 52758

(51) Int. Cl.
*G06F 3/033* (2013.01)
(52) U.S. Cl.
USPC ......................................... 345/184; 345/156
(58) Field of Classification Search
USPC ............................................... 345/156–184
See application file for complete search history.

(56) References Cited

U.S. PATENT DOCUMENTS

| 5,278,532 | A  | * | 1/1994 | Hegg et al. ......................... 345/7 |
| 6,067,492 | A  | * | 5/2000 | Tabata et al. ..................... 701/51 |
| 6,154,201 | A  | * | 11/2000 | Levin et al. .................... 345/184 |
| 6,300,940 | B1 | * | 10/2001 | Ebina et al. .................... 345/161 |
| 6,686,911 | B1 | * | 2/2004 | Levin et al. .................... 345/184 |
| 7,233,313 | B2 | * | 6/2007 | Levin et al. .................... 345/156 |
| 7,489,309 | B2 | * | 2/2009 | Levin et al. .................... 345/184 |
| 7,675,026 | B2 | * | 3/2010 | Lum et al. ................. 250/231.18 |
| 8,188,989 | B2 | * | 5/2012 | Levin et al. .................... 345/184 |
| 8,247,758 | B2 | * | 8/2012 | Lum et al. ................. 250/231.18 |
| 2004/0100440 | A1 | * | 5/2004 | Levin et al. .................... 345/156 |
| 2007/0057781 | A1 | * | 3/2007 | Breed ........................ 340/457.1 |
| 2007/0152988 | A1 | * | 7/2007 | Levin et al. .................... 345/184 |
| 2009/0079711 | A1 | * | 3/2009 | Monney et al. ................ 345/184 |
| 2009/0079712 | A1 | * | 3/2009 | Levin et al. .................... 345/184 |
| 2010/0117995 | A1 | * | 5/2010 | Park et al. ..................... 345/184 |

* cited by examiner

*Primary Examiner* — Dmitriy Bolotin
(74) *Attorney, Agent, or Firm* — Lawrence D. Hazelton

(57) ABSTRACT

Manual control interface including: a movable part, a photo-detector, a movable holographic element including a first series of holograms forming coding motifs of the selection position of the movable part, characterized by the fact that the movable holographic element includes a second series of holograms forming figurative motifs representing the functions of the apparatus, the position of the movable holographic element relative to the support determining the figurative motif which is illuminated by a suitable light beam, so as to project the figurative motif corresponding to the selected function towards a display zone visible to the user.

12 Claims, 5 Drawing Sheets

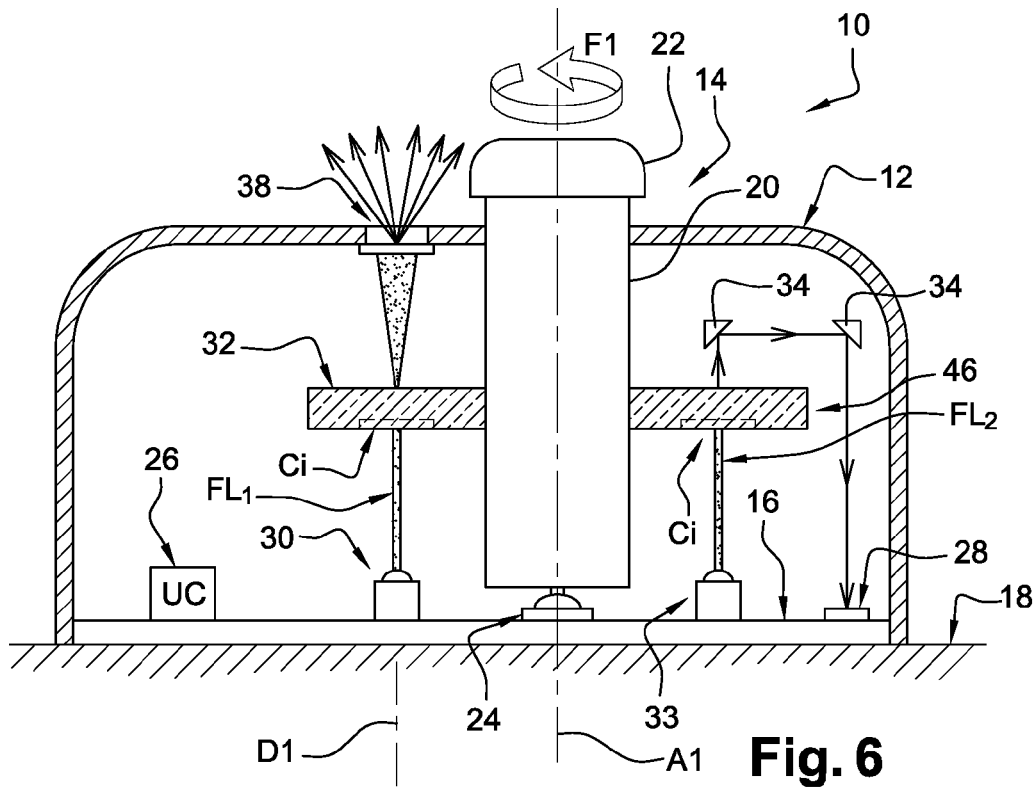
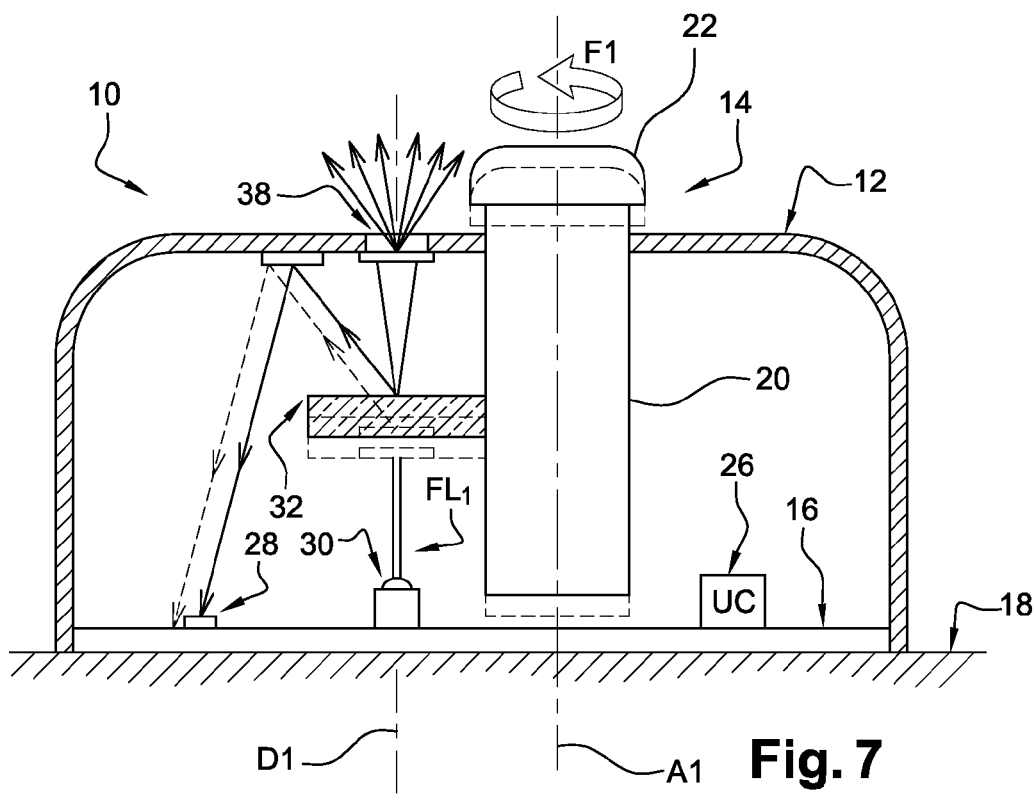

INDEXING AND HOLOGRAPHIC DISPLAY SYSTEM FOR MANUAL CONTROL INTERFERENCE

CROSS-REFERENCE TO RELATED APPLICATION

This application claims the benefit under 35 U.S.C. §371 of published PCT Patent Application Number PCT/EP 2011/054524, filed Mar. 24, 2011, claiming priority to French patent application number FR1052758 filed on Apr. 12, 2010, and published as WO2011/128196 on Oct. 20, 2011, the entire contents of which is hereby incorporated by reference herein.

TECHNICAL FIELD OF INVENTION

The present invention relates to a manual control interface in particular for a motor vehicle dashboard.

BACKGROUND OF INVENTION

The present invention relates more particularly to a manual control interface.

Such a type of interface is particularly suitable for use in the passenger compartment of a motor vehicle in which a plurality of apparatus having different functions must be able to be controlled simply and ergonomically by the driver of the vehicle. Interfaces have therefore already been proposed in the form of turning knobs or in the form of joysticks to control for example the air-conditioning device, the car radio, disabling of the skid prevention device etc. together.

The document EP1862773 describes an example of a switch able to be used in a vehicle and using a photo-detector coupled to a movable holographic part provided with coding cells designed to detect the different positions of the movable part of the switch. Such a type of switch can be used in a control interface.

This type of switch has many advantages. However, this document does not make provision for a display means for the selected functions.

SUMMARY OF THE INVENTION

The present invention is intended to propose in particular a control interface integrating in optimized manner the detection of the selected function and the display of the selected function.

To this end, the invention proposes a manual control interface for an apparatus, in particular a motor vehicle, including: a movable part that is manually controlled in a plurality of indexed selection positions relative to a support, in a selection direction, each selection position corresponding to the selection of at least one determined function of the apparatus, a photo-detector capable of generating signals of position of the movable part, a movable holographic element the displacements of which are linked to the displacements of the movable part in the selection direction, including a first series of holograms forming coding motifs of the selection position of the movable part relative to the support able to be projected towards the photo-detector when they are illuminated by a suitable light beam, characterized by the fact that the movable holographic element includes a second series of holograms forming figurative motifs representing the functions of the apparatus, the position of the movable holographic element relative to the support determining the figurative motif that is illuminated by a suitable light beam, so as to project the figurative motif corresponding to the selected function towards a display zone visible to the user.

With very few components, the invention permits both the detection and the display of a particular function.

If it is desired to favor the reliability of the interface, a light source dedicated to the detection of the position of the movable part and a light source dedicated to the display of the selected function can be used.

Preferably, each hologram is formed of a matrix of elementary diffraction structures in relief at at least two levels, advantageously at least four levels that allows a single diffracted image to be obtained while avoiding second order images.

Advantageously, the holograms are arranged in a series of cells designed to be selectively illuminated by the light beam as a function of the selection position of the movable part, each cell simultaneously forming the coding motif and the associated figurative motif from an illumination by the same light beam, that allows a very compact control interface to be obtained using very few components.

In accordance with another advantageous characteristic of the invention, each cell includes a plurality of identical holograms forming the selected motif so as to optimize the distribution of the luminous power between the figurative motif and the coding motif in proportions that take into account the sensitivity of the observer, the sensitivity of the photo-detector, and the power of the light source.

In accordance with other advantageous characteristics of the invention: the movable part is displaced relative to the support in an activation direction distinct from the selection direction between a neutral position and an activation position, the movable holographic element is linked to the displacements of the movable part in the activation direction, and the coding motifs are so arranged on the holographic element that, in the activation position, the coding motifs are projected at least partially outside the photo-detector, the absence of detection of the coding motifs by the photo-detector triggering an activation signal of the selected function; the movable part is displaced relative to the support in an activation direction distinct from the selection direction between a neutral position and an activation position, and the displacement of the movable part in the activation direction is independent of the displacement of the movable holographic element; the movable part is mounted in rotation about an axis, the selection direction corresponding to the movement of rotation of the movable part, and the movable holographic element is carried by the movable part; the movable holographic element includes a sector of annular disc made of transparent optical material and the holograms are formed in the thickness of the disc; the movable holographic element includes at least one additional figurative motif that represents a state of the selected function and is arranged outside the cell corresponding to the selected function, the said additional figurative motif being illuminated by an additional light source and projected towards an additional display zone; the photo-detector and the light source producing the light beam illuminating the movable holographic element are arranged on a printed circuit board carried by the support; the coding motif corresponding to the selected function is projected onto the photo-detector after reflection on at least one reflective element, and at least the illuminated portion of the movable holographic element is arranged between the reflective element and the light source; the display zone includes an optical diffusion element.

The present invention also proposes a method for display of a function selected by a manual control interface in accordance with one of the preceding characteristics, characterized by the fact that it includes the following steps: detection of an indexed selection position after displacement of the movable part in the selection direction, display of the selected function in the form of a holographic figurative motif corresponding to the selection position from the light source used by the photo-detector.

Preferably, the method includes a step of detection of the state of activation of the selected function by means of the photo-detector.

BRIEF DESCRIPTION OF DRAWINGS

Other characteristics, aims and advantages of the invention will become apparent on reading the following detailed description, and with reference to the attached drawings, given by way of non-limiting example and in which:

FIG. 6 is a view similar to that of FIG. 1 that shows a second embodiment of the control interface in accordance with the invention including two light sources;

FIG. 7 is a view similar to that of FIG. 1 that shows a third embodiment of the control interface in accordance with the invention in which the photo-detector with which the interface is provided detects both the position of the movable part and the activation of the selected function;

DETAILED DESCRIPTION

In the remainder of the description, identical or similar elements will be designated by the same reference signs. In addition, by way of non-limiting example will be used vertical V, longitudinal L, and transversal T orientations according to the reference V, L, T that is shown in the figures.

Figure 1:
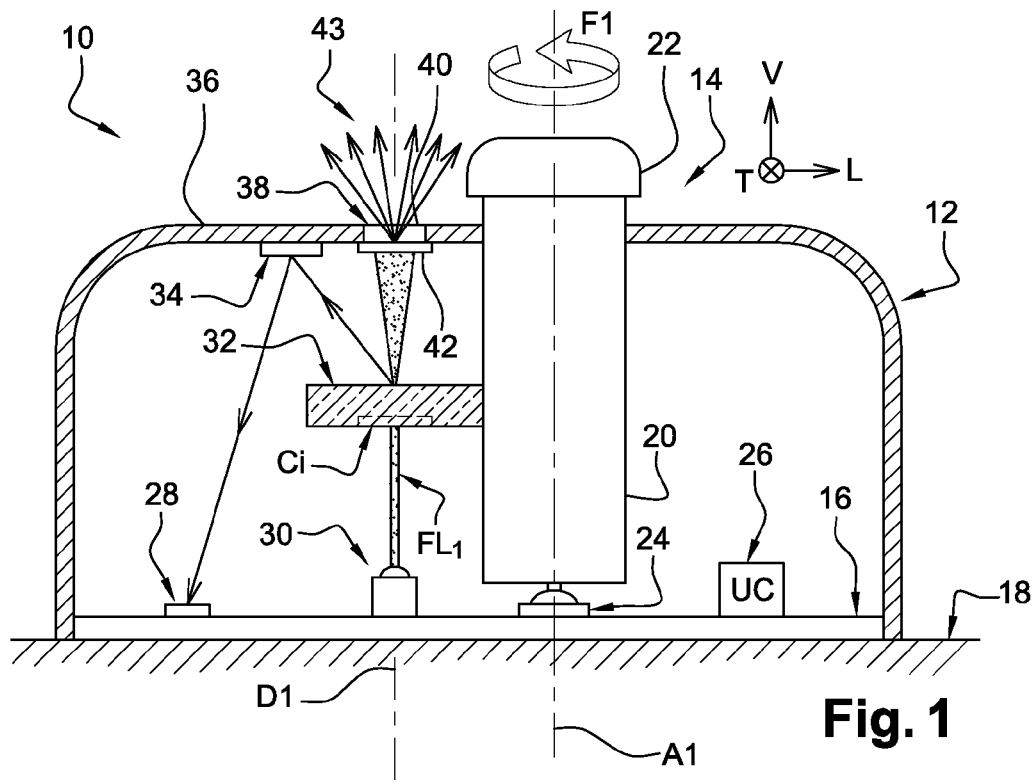
FIG. 1 is a view in longitudinal axial section that shows diagrammatically a first embodiment of the control interface in accordance with the invention including a single light source.

In FIG. 1 has been shown a first embodiment of a manual control interface 10 produced in accordance with the teachings of the invention. This interface 10 is designed to be arranged in the passenger space of a vehicle, for example on the dashboard, and it is intended to control different functions of the vehicle like the air-conditioning device, the car radio, and the disabling of the skid-prevention system.

The manual control interface 10 here includes a case 12 in which are housed the main components of the interface 10, in particular a manual control movable part 14 and a printed circuit board 16 that is fixed on a support 18. The printed circuit board 16 extends generally in a horizontal plane.

The movable part 14 here has the form of a switch rotatable about a main vertical axis of rotation A1. It is controlled manually in a plurality of indexed angular selection positions relative to the support 18, in a selection direction symbolized by the arrow F1. Each selection position corresponds to the selection of at least one determined function FTi of the vehicle. The letter "i" can here take the values 1 to n depending on the number n of functions available.

In accordance with the embodiment shown, the movable part 14 is also controlled manually by sliding along the axis of rotation A1 between an upper neutral position PN (shown in FIG. 1) and a lower activation position PA so as to allow the activation and the disabling of the selected function FTi. In FIG. 1, the activation position PA is shown in broken lines.

The movable part 14 here includes, along the axis of rotation A1, a shaft 20 provided at its upper axial end with a knob 22 designed to be manipulated by a user such as the driver of the vehicle, the knob 22 extending outside the case 12. The shaft 20 is linked in rotation to the knob 22. It is guided in rotation and sliding relative to the support 18 by means of suitable means (not shown).

The activation/disabling of the selected function FTi is obtained by an axial pressure applied to the knob 22 and symbolized by the arrow F2. A pressure switch 24, for example of the type with a deformable dome, is arranged on the printed circuit board 16, under the shaft 20, so as to switch when an axial pressure is applied on the knob 22 and so as to generate an activation signal to a central unit 26.

The interface 10 includes a photo-detector 28 that is arranged on the printed circuit board 16 and is designed to generate position signals of the movable part 14 and transmit them to the central unit 26.

The central unit 26 is designed to process the signals from the pressure switch 24 and from the photo-detector 28 in order to emit control signals corresponding to the selected function FTi.

A light source 30, such as a laser diode, emitting a light beam FL1 of generally coherent and monochromatic light, is arranged on the printed circuit board 16 and controlled by the central unit 26.

The light beam FL1 is here directed in a direction D1 parallel with the axis of rotation A1 towards a movable holographic element 32 the displacements of which are linked to the angular displacements of the movable part 14 about its axis A1. The movable holographic element 32 includes a first series S1 of holograms forming coding motifs MCi of the selection position of the movable part 14 relative to the support 18 able to be projected towards the photo-detector 28 when they are illuminated by the light beam FL1.

Figure 3:
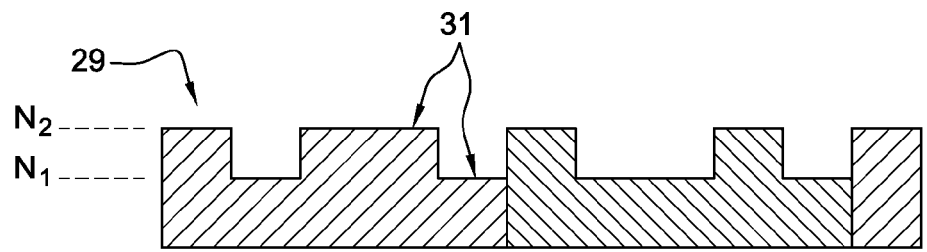
FIG. 3 is a view in axial section that shows diagrammatically the structure of a two-level diffraction matrix arranged in the movable holographic element of FIG. 2.
Figure 5:
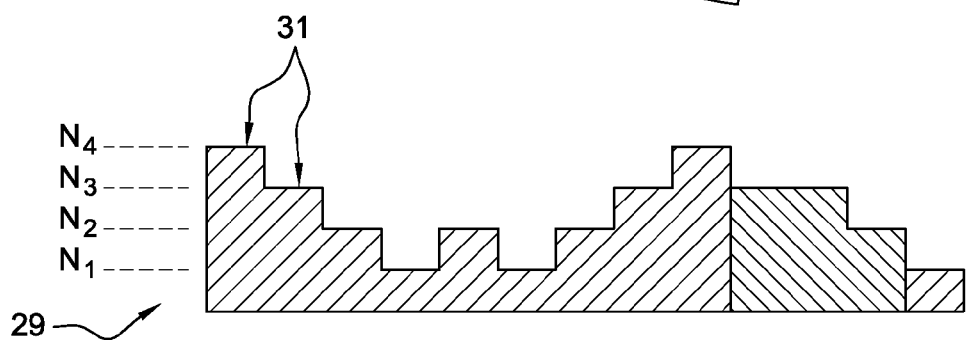
FIG. 5 is a view similar to that of FIG. 3 that shows diagrammatically the structure of a diffraction matrix with four levels instead of two.

In accordance with the first embodiment, as shown diagrammatically in FIGS. 3 and 5, each hologram is formed of a matrix 29 of elementary diffraction structures 31 in relief at at least two levels Nx, x being a power of 2. In accordance with the example of FIG. 3, the matrix 29 includes two levels N1, N2, while in accordance with the example of FIG. 5, the matrix 29 includes four levels N1, N2, N3, N4.

Structures with four or more levels will preferably be used due to their high-energy efficiency.

The coding of the holograms on four levels permits finer digitization of the information. On lighting of the matrix 29, better energy efficiency is obtained because there is less undiffracted light energy. The lighting of a four-level matrix gives a single diffracted image while a two-level matrix produces an image and its symmetrical image (secondary orders). The secondary orders produce a superfluous appearance of the projected motif at undesirable locations. The structures at four or more levels therefore permit avoidance of the appearance of these secondary orders in the projected holographic motifs.

The structure of the matrix is calculated by computer to form the selected hologram. The light beam FL1 that passes through the matrix is diffracted by the diffraction structures and projects onto the photo-detector 28 the coding motif MCi that forms a binary optical code readable by the photo-detector 28 and directly and instantaneously transformed into a binary electronic code.

Additional details regarding the structure and the advantages of the use of holographic MCi coding motifs are described in particular in the document EP1862773A1, in particular in paragraphs [0004] to [0009].

Advantageously, the movable holographic element 32 is formed by a sector of annular disc that is made of optical material. Optical material here means a substantially transparent material able to be provided with diffraction gratings forming holograms. In particular, this optical material advantageously permits the creation of holograms in the form of relief diffraction structures in the thickness of the sector of annular disc. Optical plastics such as methyl polymethacrylate (PMMA) or else polycarbonate can be used for this purpose. The diffraction structures can be made from this type of material at low cost, particularly by injecting or embossing.

In accordance with the embodiment shown, a part of the light beam FL1 that passes through the movable holographic element 32 is reflected on a reflective element 34 carried by the upper part 36 of the case 12 before reaching the photo-detector 28 where it projects the coding motif MCi associated with the selected function FTi.

In accordance with the teachings of the invention, the movable holographic element 32 includes a second series S2 of holograms forming figurative motifs MFi representing the functions FTi of the vehicle. The position of the movable holographic element 32 relative to the support 18 determines the figurative motif MFi that is illuminated by the light beam FL1, so as to project the figurative motif MFi corresponding to the selected function FTi towards a display zone 38 visible to the user. The figurative motifs MFi can be formed of letters of the type "ESP", "A/C", and pictograms.

The holograms forming the figurative motifs MFi are obtained in a similar manner to the holograms forming the coding motifs MCi.

Figure 2:
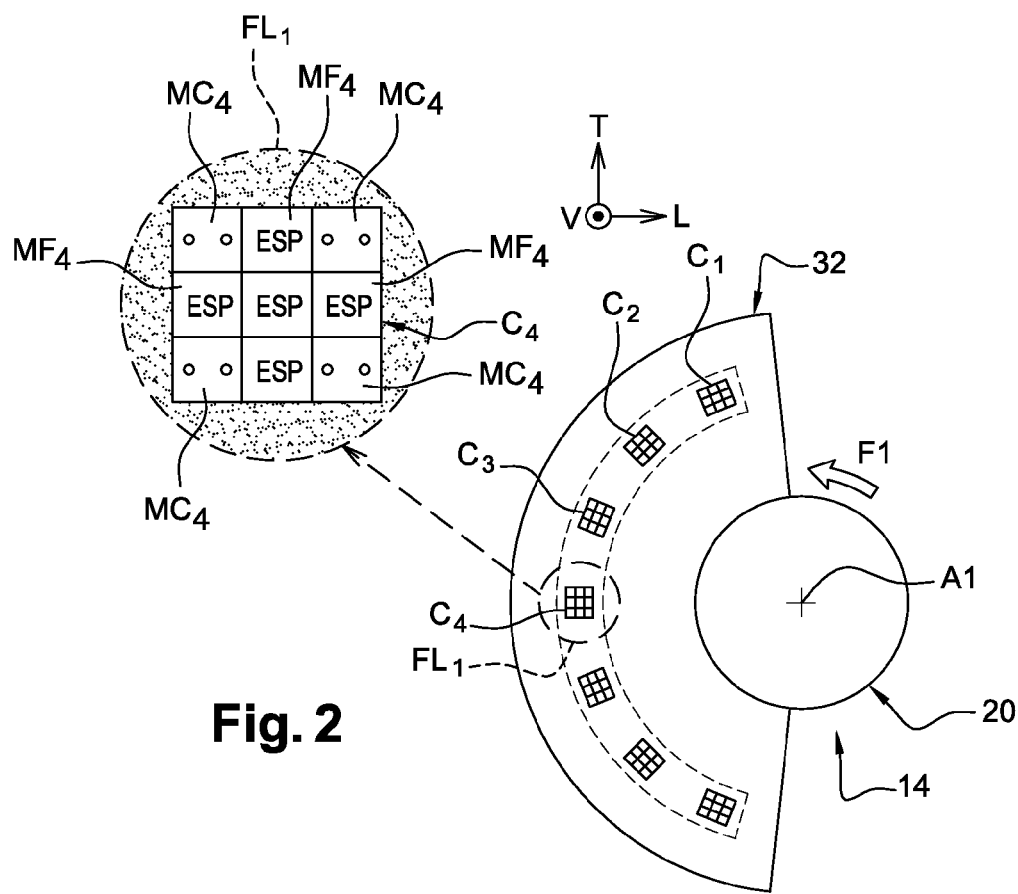
FIG. 2 is a view in cross-section that shows diagrammatically the arrangement of the holograms on the movable holographic element with which the control interface of FIG. 1 is provided.

Advantageously, in accordance with the first embodiment, as shown in FIG. 2, the holograms are arranged in a series of cells Ci designed to be illuminated selectively by the light beam FL1 as a function of the selection position of the movable part 22. Each cell Ci corresponds to a selected function FTi and includes at least two holograms, one forming the coding motif MCi and the other the figurative motif MFi. Thus, when the cell Ci is illuminated by the light beam FL1, the coding motif MCi and the figurative motif MFi are projected simultaneously towards the photo-detector 28 and towards the display zone 38 respectively. A single light source 30 is therefore sufficient for the detection of the selected function FTi and the display of the selected function FTi.

In the example shown in FIG. 2, the spot produced by the light beam FL1 illuminates the cell C4 that corresponds to the function FT4 of disablement of the skid-prevention system symbolized by the letters "ESP". The coding motif MC4 is here formed of two light points separated by a space of determined length and the figurative motif MF4 is formed by the letters "ESP".

Advantageously, as shown in FIG. 2, each cell Ci includes a plurality of identical holograms forming the selected coding motif MCi and a plurality of identical holograms forming the selected figurative motif MFi. Thus, each motif is projected in the form of a plurality of superimposed images that permits amplification of the luminous intensity of the projected motif. Here, the figurative motif MF4 of the selected function FT4 is repeated more often than the coding motif MC4 as the luminous intensity in the display zone 38 is of major importance to ensure good visibility of the selected function FT4.

More precisely, each projected motif MCi, MFi has an intensity proportional to the area lit in the plane of the hologram. Thus taking the example of FIG. 2, in which the figurative motif MF4 is repeated five times while the coding motif MC4 is only repeated four times, a ratio of 5/4 exists between the luminous energy dedicated to the figurative motif MF4 and the luminous energy dedicated to the coding motif MC4. Of course, the ratio between the area occupied by the figurative motif MF4 and the area occupied by the coding motif MC4 also permits optimization of the allocation of luminous power for optimal use of the power of the light source 30. An optimal ratio is to be calculated as a function of the sensitivity of the photo-detector 28, of the sensitivity of the observer, and of the power of the light source 30.

The display zone 38 here includes a window 40 formed in the upper part 36 of the case 12, facing the movable holographic element 32. The window 40 is made for example of transparent thermoplastics of the type of methyl polymethacrylate (PMMA). Preferably, the thermoplastics is smoked to improve the contrast during display of the selected function as well as for reasons of appearance. A diffuser 42 is arranged on the lower face of the window 40 so as to produce the plane in which the figurative motif MFi is perceived by the observer. The diffuser 42 also has the function of widening the angular emission cone 43 and therefore the visibility of the figurative motif MFi as well as minimizing the granularity (speckle) effect.

In accordance with the first embodiment, the sliding of the movable part 14 is independent of the displacement of the movable holographic element 32. The movable holographic element 32 is for example mounted on the shaft 20 by means of a hinge (not shown) permitting the displacement of the movable part 14 towards the activation position without causing the displacement of the movable holographic element 32 downwards, this remaining in its axial position.

Figure 4:
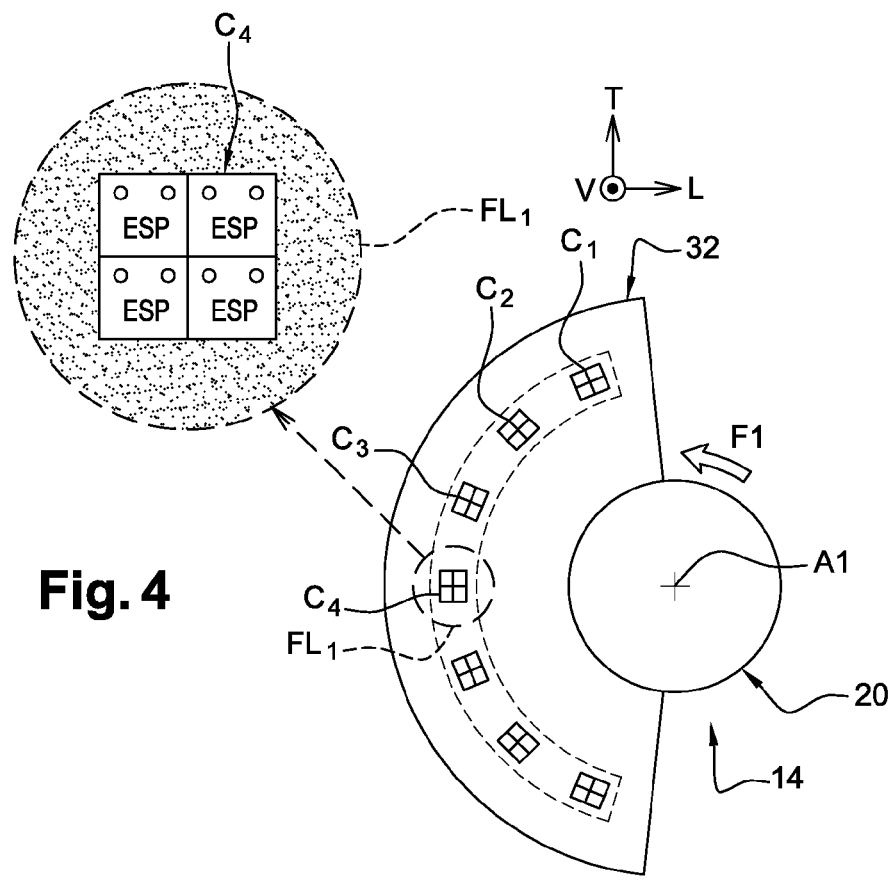
FIG. 4 is a view similar to that of FIG. 2 that shows a modification of the first embodiment in which each hologram includes a coding motif and a figurative motif.

In accordance with a modification of the first embodiment, shown in FIG. 4, each cell Ci includes a plurality of identical holograms, each of these holograms forming both the coding motif MCi and the associated figurative motif MFi. The display information and the coding information are integrated in the same hologram repeated periodically in the cell Ci. The ratio between the luminous energy projected in the form of figurative motif and the luminous energy projected in the form of coding motif corresponds in this case to the ratio of the areas occupied by the two motifs in the hologram in question.

A second embodiment of the invention is now described with reference to FIG. 6. This second embodiment is distinguished from the first by the fact that it includes two light sources 30, 33 respectively forming a first light beam FL1 that produces the figurative motif MFi and a second light beam FL2 that produces the coding motif MCi corresponding to the selected function FTi. The two light sources 30, 33 are here arranged on either side of the movable part 14.

The movable holographic element 32 is here formed by an annular disc mounted on the shaft 20 so that a first angular sector 44 is positioned facing the first light source 30 while a second angular sector 46 is positioned facing the second light source 33. Two reflective element 34 are here arranged suitably to direct the second light beam FL2 towards the photo-detector 28.

In this second embodiment, the cell Ci illuminated by the first light beam FL1 contains only the figurative motif MFi and the cell Ci illuminated by the second light beam FL2 contains only the coding motif MCi.

A third embodiment of the invention is shown in FIG. 7. This third embodiment is distinguished from the first by the fact that the movable holographic element 32 is fixed on the shaft 20 of the movable part 14 so as to be linked to its axial sliding on the activation/disabling of the selected function FTi.

In this third embodiment, the coding motifs MCi are arranged on the movable holographic element 32 so that the displacement of the movable part 14 to its activation position PA causes a displacement of the projected coding motif MCi relative to the photo-detector 28, the said projected coding motif MCi then being partially outside the sensitive zone of the photo-detector 28. Thus, the absence of detection of the coding motif MCi in its entirety by the photo-detector 28 triggers an activation signal of the selected function FTi. The pressure switch 24 is then no longer necessary, the photo-detector 28 serving both for the detection of the angular position and of the axial position PN, PA of the movable part 14. This embodiment permits implementation of a display function, of a coding function and of a switching function without having recourse to contacts between pieces and therefore avoiding any faults related to wear.

Figure 8:
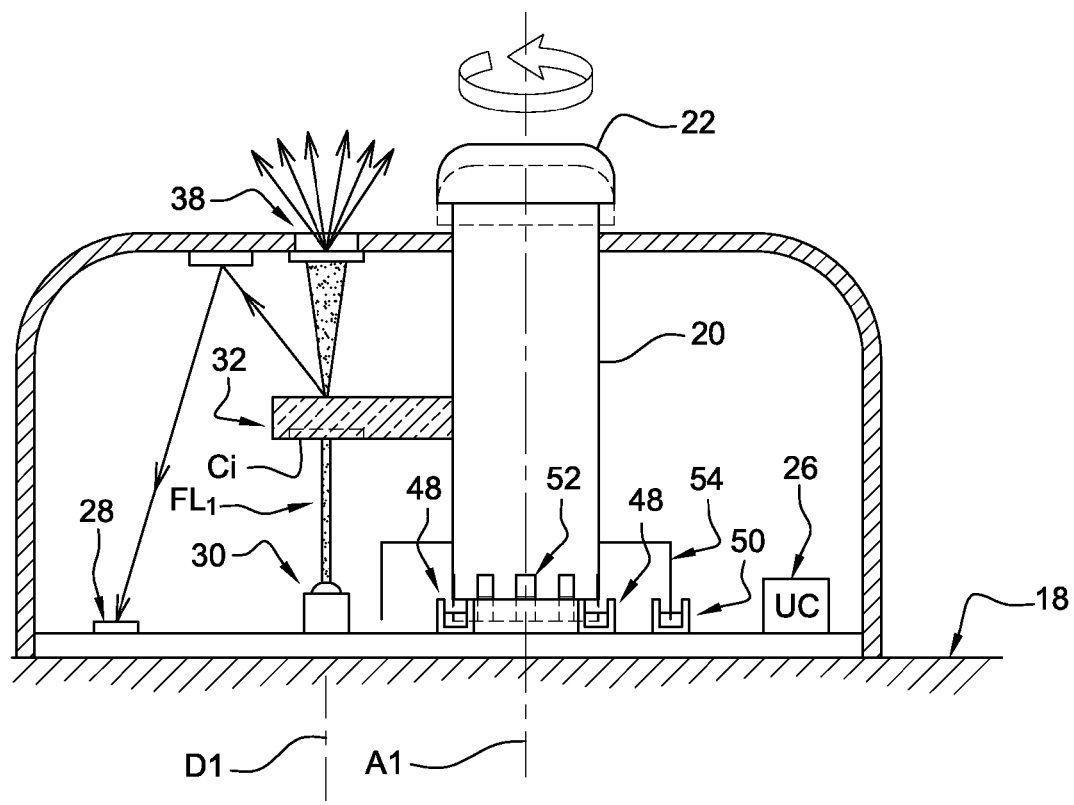
FIG. 8 is a view similar to that of FIG. 1 that shows a fourth embodiment of the control interface in accordance with the invention including fork photo-detectors to detect the activation of the selected function and of other operating parameters

In accordance with a fourth embodiment of the invention, that is shown in FIG. 8, the pressure switch 24 of the first embodiment is replaced by optical forks 48, 50 that are arranged on the printed circuit board 16. Each optical fork 48, 50 produces a light beam in a transversal plane, between the two branches of the fork that, when it is interrupted, causes switching. The shaft 20 of the movable part 14 includes at its lower axial end tongues 52, 54 designed to cooperate with the optical forks 48, 50 being positioned between the branches of a fork so as to allow the detection of the axial sliding of the shaft 20.

In accordance with this fourth embodiment, the movable part 14 is designed to be able to turn about its axis A1 when it occupies its activation position PA. This is intended to permit control by means of the movable part 14 of a plurality of states of the selected function FTi. For example, if the selected function FTi is the volume of the car radio, the rotation of the movable part 14 in the activation position PA allows control of its intensity.

The tongues 52, 54 and the associated photo-detectors 48, 50 can be so arranged as to allow the detection of the direction of rotation and/or of the number of increments of rotation of the movable part 20 and/or of the speed of rotation of the movable part 20.

Advantageously, the mounting of the movable holographic element 32 on the shaft 20 permits, in the activation position PA, a rotation of the shaft 20 without rotation of the movable holographic element 32. A locking device by means of a spline on the shaft 20 and associated notches on the movable holographic element 32 can for example be provided for this purpose.

Figure 9:
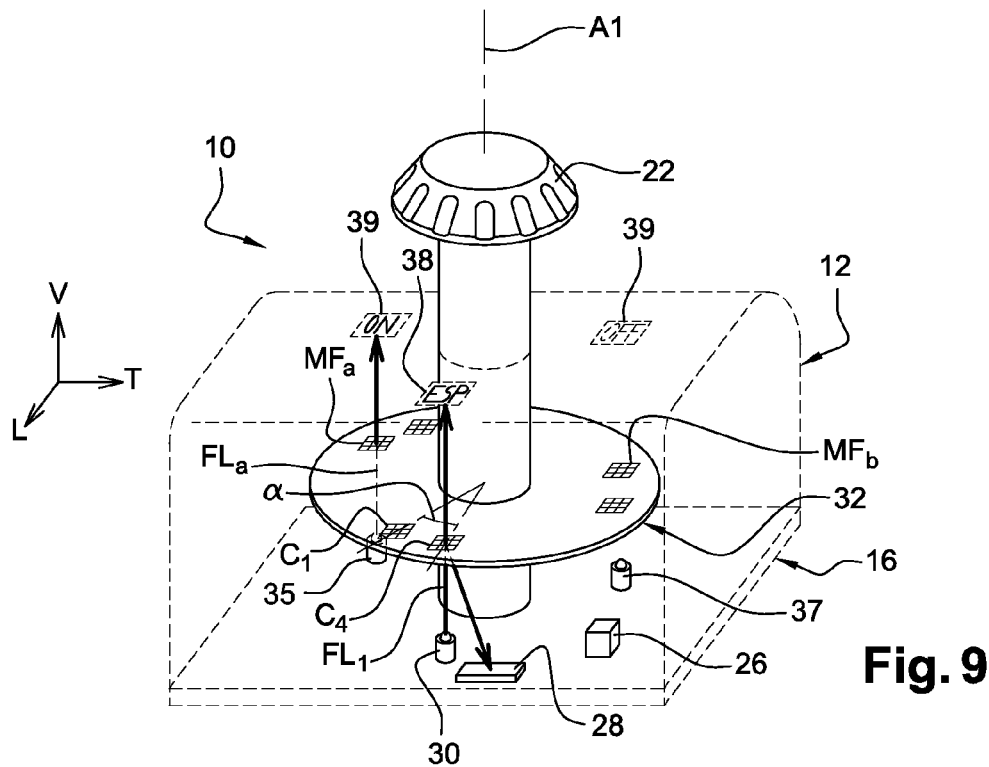
FIG. 9 is a perspective view that shows diagrammatically a fifth embodiment of the control interface in accordance with the invention including three light sources designed to allow both the display of the selected function and the display of the state of the selected function.
Figure 10:
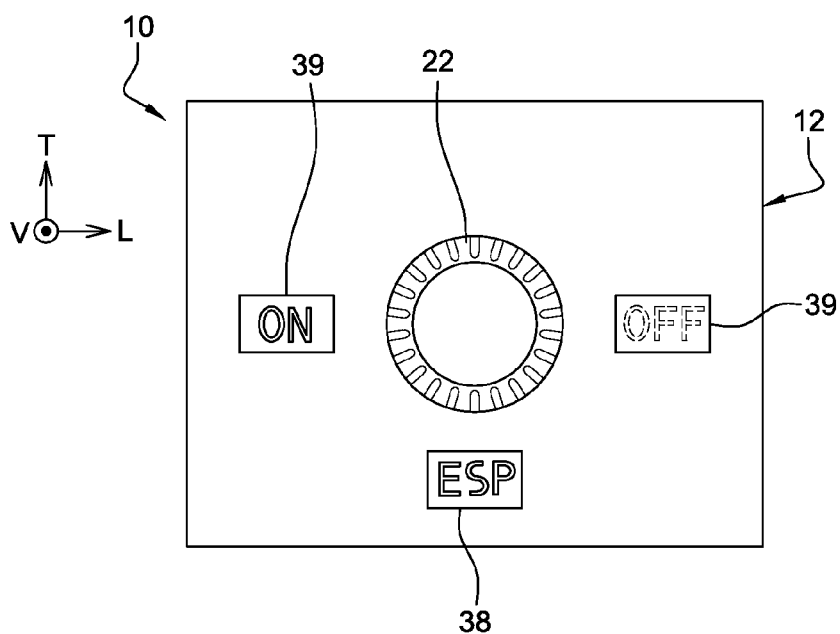
FIG. 10 is a view from above of the interface of FIG. 9 that shows the display of the selected function and the display of its state.

A fifth embodiment of the invention is shown in FIGS. 9 and 10, in which at least one selected function FTi has at least two activated/disabled states that are displayed by the control interface 10 in accordance with the invention. In accordance with this embodiment that is here derived from the first embodiment (FIG. 1), the interface 10 includes two additional light sources 35, 37, in addition to the main light source 30, that are designed to display the states of the function FTi, here the activated state ON and the disabled state OFF of the skid-prevention function FT4. The lighting of the additional light sources 35, 37 is controlled by the central unit 26.

The interface 10 here operates in a similar manner to the first embodiment for the display and detection of the selected function FTi by means of the main light source 30 and of the photo-detector 28. This operation will not therefore be described in detail.

In accordance with the fifth embodiment, when the skid-prevention function FT4 is selected by means of the knob 22, one of the additional light sources 35, 37 is lit and produces an additional light beam FLa that illuminates an additional figurative motif MFa arranged on the movable holographic element 32 in order to display the state of the selected function FT4, here the activated state ON looking at FIGS. 9 and 10. By means of the additional light beam FLa, the additional figurative motif MFa is projected towards an additional display zone 39 arranged on the case 12 and visible to the user.

In accordance with the embodiment shown here, the additional figurative motif MFa is angularly offset by 90 degrees, in the clockwise direction looking at FIG. 10, relative to the cell C4 containing the figurative motif MF4 displaying the selected function FT4. An additional figurative motif MFb, that is here designed to represent the disabled state OFF of the selected function FT4 is angularly offset by 90 degrees, in the anti-clockwise direction looking at FIG. 10 on the movable holographic element 32. The additional light source 37 that is associated with it is here extinguished.

Advantageously, the user can select another function FT1, such as the function of selection of the driver/passenger temperature mode, of which the cell C1 including the associated figurative motif MF1 and coding motif MC1 is offset by a determined angle α relative to the cell C4 corresponding to the skid-prevention function FT4. The additional figurative motifs MFa, MFb associated with this other function FT1 are offset by the same angle α relative to the additional figurative motifs MFa, MFb associated with the skid-prevention function FT4. Thus, when the user selects the other function FT1 by turning the knob by the angle α, the interface 10 displays the other function FT1 and its state by means of the additional figurative motifs MFa, MFb, and additional light sources 35, 37.

In accordance with an advantageous embodiment, the main 30 and additional 35, 37 light sources produce beams FL1, FLa of distinct colors that allows the selected function FTi and its state to be displayed with different colors.

The fifth embodiment has the advantage of allowing both the detection and the display of the selected function FTi and the display of the state of this function FTi by means of the same movable holographic element 32 that includes a plurality of zones or cells Ci dedicated to the different display functions.

Of course, certain characteristics of the different embodiments can be combined. In particular, in the first embodiment, the pressure switch 24 could be replaced by another type of switch such as a switch using optical forks as in FIG. 8.

A method for display of a selected function FTi by means of the manual control interface 10 in accordance with the first embodiment of the invention is now described. This method includes the following steps: detection of an indexed selection position after pivoting of the movable part 14 about its axis A1, display of the selected function FTi in the form of a holographic figurative motif MFi corresponding to the selection position from the light source 30 used by the photo-detector 28.

In the case of the second embodiment, this method includes in addition a step of detection of the state of activation of the selected function FTi by means of the photo-detector 28.

The invention claimed is:

1. A manual control interface for controlling an apparatus, in particular a motor vehicle, including:
    a movable part configured to be controlled manually to a plurality of indexed selection positions in a selection direction relative to a support, wherein each selection position indicative of a selection of at least one determined function of the apparatus,
    a photo-detector configured to generate position signals indicative of the position of the movable part; and
    a movable holographic element coupled to the moveable part such that displacements of the movable holographic element correspond to displacements of the movable part in the selection direction, wherein the moveable holographic element includes a first series of holograms forming coding motifs corresponding to the selection position of the movable part relative to the support, wherein the coding motifs are projected towards the photo detector when they are illuminated by a suitable light beam, wherein
    the movable holographic element includes a second series of holograms forming figurative motifs configured to represent the functions of the apparatus, wherein the position of the movable holographic element relative to the support determines which figurative motif is illuminated by the suitable light beam, so as to project the figurative motif corresponding to the selected function towards a display zone visible to the user.

2. The interface as described in claim 1, wherein each hologram is formed of a matrix of elementary diffraction structures in relief at at least two levels.

3. The interface as described in claim 1, wherein the holograms are arranged in a series of cells configured to be selectively illuminated by the light beam based on the selection position of the movable part, wherein each cell simultaneously projects the coding motif and the associated figurative motif when illuminated by the same light beam.

4. The interface as described in claim 3, wherein each cell includes a plurality of identical holograms forming the selected motif configured to optimize the distribution of the luminous power in the figurative motif and in the coding motif.

5. The interface as described in claim 1, wherein the movable part is characterized as being displaced relative to the support in an activation direction distinct from the selection direction and between a neutral position and an activation position, wherein the movable holographic element is linked to the displacements of the movable part in the activation direction, wherein the coding motifs are arranged on the holographic element such that, in response to displacement to the activation position (PA), the coding motifs are projected at least partially outside the photo-detector, whereby the absence of detection of the coding motifs by the photo-detector triggers an activation signal of the selected function.

6. The interface as described in claim 1, wherein the movable part is configured to be displaced relative to the support in an activation direction (F2) distinct from the selection direction (F1) between a neutral position (PN) and an activation position (PA), wherein displacement of the movable part in the activation direction is characterized as being independent of the displacement of the movable holographic element.

7. The interface as described in claim 1, wherein the movable part is configured to be movable in rotation about an axis in the selection direction, and the movable holographic element is carried by the movable part.

8. The interface as described in claim 7, wherein each hologram is formed of a matrix of elementary diffraction structures in relief at at least two levels, wherein the movable holographic element includes a sector of annular disc made of a transparent optical material and the holograms are formed in the thickness of the disc.

9. The interface as described in claim 7, wherein the movable holographic element includes at least one additional figurative motif configured to indicate a state of the selected function and is arranged outside the cell corresponding to the selected function, the said additional figurative motif ($MF_a$, $MF_b$) being illuminated by an additional light source and projected towards an additional display zone.

10. The interface as described in claim 1, wherein the photo-detector and the light source producing the light beam illuminating the movable holographic element being arranged on a printed circuit board carried by the support.

11. The interface as described in claim 10, wherein the coding motif corresponding to the selected function being projected onto the photo-detector after reflection on at least one reflective element, and by at least the illuminated portion of the movable holographic element being arranged between the reflective element and the light source.

12. The interface as described in claim 1, wherein the display zone includes an optical diffusion element.

\* \* \* \* \*